United States Patent [19]

Hawkins et al.

[11] Patent Number: 5,232,239
[45] Date of Patent: Aug. 3, 1993

[54] AUTOMATIC CONTROLS FOR ANTI-JACKKNIFING DEVICE AND METHOD

[76] Inventors: Wallace H. Hawkins, P.O. Box 3726, Greenville, S.C. 29608; David L. Burdette, Jr., 840 Tubbs Mountain Rd., Travelers Test, S.C. 29690

[21] Appl. No.: 967,812

[22] Filed: Oct. 28, 1992

Related U.S. Application Data

[63] Continuation-in-part of Ser. No. 770,571, Oct. 3, 1991, abandoned, which is a continuation-in-part of Ser. No. 597,001, Oct. 15, 1990, abandoned, and a continuation of Ser. No. 785,169, Nov. 1, 1991, abandoned.

[51] Int. Cl.⁵ .............................................. B62D 53/06
[52] U.S. Cl. ................................ 280/432; 188/112 A; 188/181 R; 280/446.1
[58] Field of Search ............................ 280/432, 446.1; 180/305, 69.6; 188/181 R, 181 A, 112 R, 112 A; 324/174, 173

[56] References Cited

U.S. PATENT DOCUMENTS 4,784,403 11/1988 Hawkins et al. .................. 280/432
4,934,727 6/1990 Hawkins et al. .................. 280/432

*Primary Examiner*—Mitchell J. Hill
*Attorney, Agent, or Firm*—Ralph Bailey

[57] ABSTRACT

A coupling linking a tractor 10 and a trailer 11 having a fifth wheel assembly 12 having a longitudinal outwardly tapering slot defined by spaced ears 15 is provided with an anti-jackknifing apparatus A, B. Sensor C located adjacent a rear wheel 16 of the trailer generates a frequency reflective of the speed of the tractor and trailer. A radar gun, and the like or other sensor may also be used to determine ground speed. Upon receiving a frequency corresponding to a speed exceeding a predetermined speed, a speed controlled switch D engages the anti-jackknifing apparatus. Similarly, the switch D automatically disengages the apparatus upon receiving a frequency signal corresponding to a speed below the predetermined speed or, upon the occurrence of certain conditions, the activation of a turning signal by the driver. A signal light E mounted externally on the trailer indicates when the apparatus has been activated.

19 Claims, 3 Drawing Sheets

AUTOMATIC CONTROLS FOR ANTI-JACKKNIFING DEVICE AND METHOD

This application is a Continuation-in-Part of application Ser. No. 07/770,571, filed Oct. 3, 1991 now abandoned, entitled AUTOMATIC CONTROLS FOR ANTI-JACKKNIFING DEVICE AND METHOD, which is a Continuation-in-Part of application Ser. No. 07/597,001, filed Oct. 15, 1990 now abandoned, entitled ANTI-JACKKNIFING APPARATUS AND METHOD, continued as application Ser. No. 07/785,169 filed Nov. 1, 1991, now abandoned.

BACKGROUND OF THE INVENTION

This invention relates to anti-jackknifing devices between a tractor and a trailer and controls therefor.

Various attempts to prevent jackknifing have included the provision of apparatus and method disclosed in U.S. Pat. No. 4,700,966, whereby angular movement between a tractor and trailer is limited upon activation of an anti-jackknifing apparatus mounted beneath the trailer. That system requires the driver to manually activate and deactivate the apparatus, based upon certain audio and visual signals rendered by displays within the cab of the tractor indicating that the angle between the tractor and the trailer has exceeded a predetermined angle, as for example 15°. Thus, for example, a driver would have to manually deactivate the system each time he enters a turn resulting in an angle between the tractor and the trailer exceeding the said predetermined angle so that free pivotal motion is thereafter allowed between the tractor and trailer. Such a system has been shown to have imposed an excessive amount of discretion upon the driver, who must additionally remain alert for other factors influencing the safe operation of his rig. Consequently, the anti-jackknifing apparatus may not be activated as often as conditions warrant. The apparatus described above additionally presents logistical problems, stemming from the necessity for providing corresponding electrical signaling equipment within the cabs of each tractor for every trailer having an anti-jackknifing apparatus. First, such electrical equipment would have to be supplied to every tractor of one's inventory, regardless of whether a corresponding trailer includes an anti-jackknifing apparatus. Thus, for example, assume a given number of tractors and trailers and that only some of the trailers have an anti-jackknifing apparatus. It would be necessary to provide electrical equipment to all of the tractors, even though a lesser number of trailers possess anti-jackknifing apparatus. Moreover, since trailers are frequently rented, one encounters the problem of locating a tractor having electrical equipment corresponding with the anti-jackknifing apparatus on the trailer. Given that only a small percentage of tractors would be so provided, locating such a tractor presents a significant logistical problem.

Accordingly, it is an important object of the invention to provide an anti-jackknifing apparatus which is automatically engaged upon attainment of a predetermined speed.

Another important object of the invention is to provide such apparatus which is automatically disengaged upon either a reduction of the speed of the trailer below a predetermined speed or the activation of a turning signal before making a turn.

Another important object of the invention is to equip a trailer with both a mechanical anti-jackknifing apparatus and corresponding electrical sensing and signaling means so that the entire anti-jackknifing system is located solely upon the trailer.

SUMMARY OF THE INVENTION

It has been found that a coupling linking a tractor and a trailer having a fifth wheel with a longitudinal outwardly tapering slot may be provided with an anti-jackknifing apparatus which is automatically engaged upon attaining a predetermined speed and automatically disengaged upon either the dropping of the speed of the trailer below said predetermined speed or where the speed is below the predetermined speed and the brake is applied, the activation of a turning signal before making a turn blocks the action of the brake as would engage the anti-jackknifing apparatus. These objectives are accomplished in part by the inclusion of sensing apparatus on the trailer reflecting the speed of the trailer signaling a switch to actuate the anti-jackknifing apparatus. A signal is provided on the trailer assuring the driver that the anti-jackknifing apparatus is in operation.

By biasing a rotatable member into driving relation with a wheel of a trailer, an actuating element is assured of placing the anti-jackknifing device in operating relation automatically upon attainment of a predetermined speed by the rig.

A further object of this invention is to provide electronic means such as a radar gun or other device located on the trailer for determining ground speed and thereby automatically actuating the anti-jackknifing apparatus without the necessity of sensing the speed of the wheels or any other component of the trailer upon the attainment of a predetermined ground speed.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1A is an end elevation taken on the line 1A—1A in FIG. 1 illustrating a rotatable shaft for moving the abutment of the anti-jackknifing apparatus into and out of operative position and switch mechanism actuated thereby for signaling that the apparatus is in operative position;

FIG. 1B is a schematic perspective view looking toward a forward cross frame member of the trailer upon which a radar gun is mounted to direct a radar signal forwardly and downwardly toward the ground a predetermined distance away;

DESCRIPTION OF A PREFERRED EMBODIMENT

The drawings illustrate an anti-jackknifing apparatus for use in connection with a coupling of a tractor having a fifth wheel with a longitudinal outwardly tapering slot therein and a trailer having a frame thereunder. An abutment member A is carried by the frame. A power operated drive B moves the abutment member into the slot and retracts it therefrom. A sensor C or other ground speed sensing means is carried by the trailer having an output signal reflecting the speed of the trailer. A speed controlled switch D is carried by the trailer actuating the power operated drive to place the abutment in the slot when a predetermined speed is attained by the trailer responsive to the output signal of the sensor. Thus, the abutment member of the anti-jackknifing apparatus is placed in operative position in the slot when the trailer reaches a predetermined speed. A signal such as light E observable by a driver of the tractor trailer indicates that the abutment is in the slot.

Figure 1:
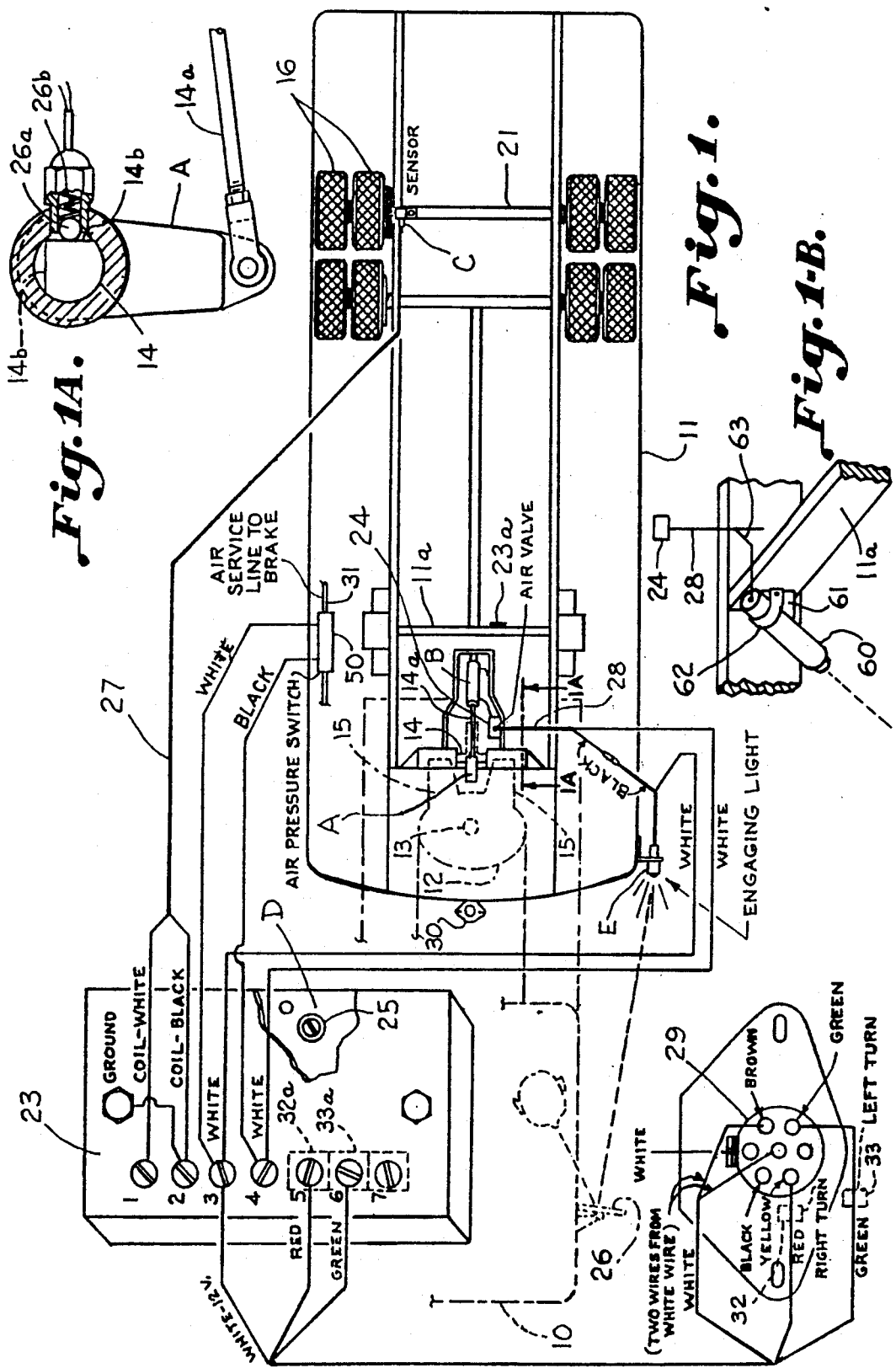
FIG. 1 is a schematic view illustrating the various operating components according to a preferred embodiment of the invention positioned on a tractor-trailer and a wiring diagram illustrating the various electrical connections.

Referring to FIG. 1, a tractor is shown in broken lines at 10, and a trailer is schematically shown at 11 looking downwardly from the top. The tractor and trailer are pivotally intercoupled trough a conventional fifth wheel 12 which receives the usual kingpin 13. The fifth wheel includes the usual outwardly tapering V-slot 30 defined by the spaced ears 15.

The angular relation between the tractor and the trailer becomes limited upon activation of the power operated drive B, which moves the abutment member A carried on the rotatable shaft 14 through the piston rod 14a into and out of the V-slot between the ears 15 which limit movement of the trailer on the fifth wheel. The specific relationship between the particular elements limiting pivotal motion, as well as hydraulic and alternate mechanical positioning systems, have been disclosed in a number of U.S. Patents including U.S. Pat. Nos. 4,700,966, 4,784,403, 4,790,556, and 4,934,727, the disclosures of which are hereby incorporated herein by reference.

Figure 2:
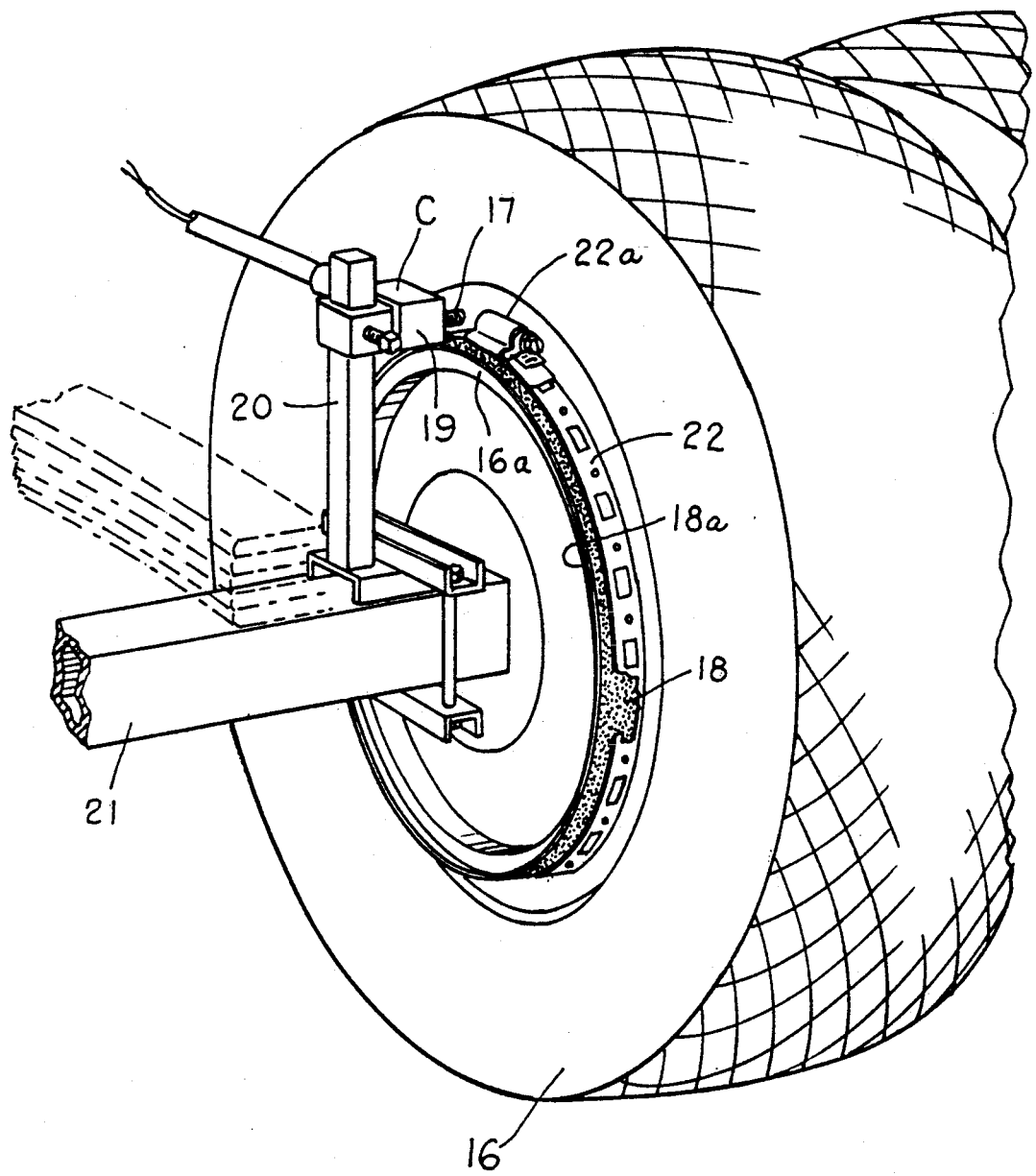
FIG. 2 is a perspective view illustrating the positioning of a sensor for generating a signal indicative of the speed of the trailer by sensing frequency of rotation of the wheels of the trailer.

FIG. 2 illustrates the sensor C as being carried adjacent a right rear wheel 16 of the trailer. The sensor C includes an outwardly projecting sensing element 17 which extends in operative relation over a magnetic tape 18 secured about the rim 16a of the wheel 16. The sensing element 17 actuates a generator 19 which generates a frequency which actuates a normally open speed controlled switch D at speeds above a predetermined or pre-set speed.

It will be observed that the sensor C is carried by a standard 20 suitably secured to the axle 21. The magnetic tape 18 is mechanically secured about the rim 16a as by a strap 22 having a strap fastener 22a. A marginal portion 18a of the tape 18 is not covered by the strap, and the sensing element 17 extends thereover.

The signal generated by the sensor C is transmitted to the terminal block 23 (FIG. 1) containing the normally open speed controlled switch D. The block 23 is mounted on a horizontal transversely extending frame member 11a beneath the trailer in a position indicated at 23a. Upon receiving such output at a predetermined frequency, the contacts (not shown) of the speed controlled switch D are closed, supplying power to the terminal 4 of the block 23 actuating the power operated drive B through a suitable actuator such as the air valve 24. The abutment member A is thereby moved into the V-slot between the ears 15. Thus, upon reaching a desirable level of speed, the anti-jackknifing apparatus is actuated or placed in operative position to guard against jackknifing. The predetermined frequency at which the switch B is closed may be varied by turning the adjustment screw 25 so as to vary the speed at which the anti-jackknifing apparatus is actuated to limit the angle between the tractor and the trailer.

Referring more particularly to FIG. 1, the sensor C is connected through the cable 27 to terminals on the block 23 for operating the speed controlled switch D which in turn actuates the air valve 24 through the cable 28. Power is supplied from the plug 29 carried by the bracket 30 at the front of the trailer.

The sensor and the speed controlled switch are well known solid state components which may be custom made to specified requirements and supplied by suppliers such as King Controls, 900 Sixth Avenue SE, Minneapolis, Minn. 55414.

At speeds below the predetermined speed special control should be exerted upon operation of the anti-jackknifing apparatus. A black wire connector on the block 23 is connected from terminal 4 to the air pressure switch 50 which is located on the trailer and connected into the air service line 31 to the trailer brakes. A white wire is connected from the terminal 3 to the other side of the air pressure switch 50 and energizes terminal 4 when the brakes are applied in excess of, for example, 38 lbs. pressure in the line 31 as in an emergency stop to actuate the anti-jackknifing apparatus. Actuation of the hazard lights normally energizes the right and left turn indicators 32 and 33 supplying current to switch components 32a and 33a for actuation of the anti-jackknifing apparatus. The anti-jackknifing apparatus is disengaged when either the right or left turn signal is actuated, thus blocking such actuation of the anti-jackknifing apparatus. It is important for the hazard lights to actuate the anti-jackknifing apparatus at speeds below the predetermined speed under hazardous conditions and for the turn signals 32 and 33 to de-energize or block such actuation.

As is best seen in FIG. 1, a signal light E is mounted externally on the trailer at the left-hand side of the driver so as to be visible to the driver when looking into the side mirror 26. FIG. 1A illustrates a mechanical switching mechanism assuring that the signal light will be on when the anti-jackknifing mechanism is in an operable position. The shaft 14 which carries the abutment A has a flat 14b. When the shaft is rotated by the piston rod 14a to withdraw the abutment A from between the ears 15, the ball rides against the shaft remote from the flat 14b. When in operable position as shown in FIG. 1A, the ball 26a is pushed in the direction of the arrow by the spring 26b against the flat 14b closing the circuit to the signal light E.

The anti-jackknifing apparatus is automatically disengaged in a manner similar to the engagement procedure described above. Once the sensor C generates a frequency corresponding to a speed below the predetermined speed, the power operated drive B retracts the abutment A from the V-slot responsive to the action of the sensor and switch, thereby disengaging the anti-jackknifing apparatus. Disengagement also occurs upon activation of a turn signal by the driver to allow free pivotal motion between the tractor and trailer. Disengagement in either case turns off the signal light E.

It is thus seen that operation of the anti-jackknifing apparatus is assured independent of operation by the driver. At speeds above a predetermined speed, the anti-jackknifing apparatus is automatically actuated so as to be in position for operation. A signal light is positively controlled by a mechanical switching operation which must operate when the anti-jackknifing apparatus is in operative position. Perhaps most important is the fact that the entire anti-jackknifing apparatus is located entirely on the trailer so that there need be no concern as to whether or not a tractor is properly equipped for use with a given trailer.

Figure 3:
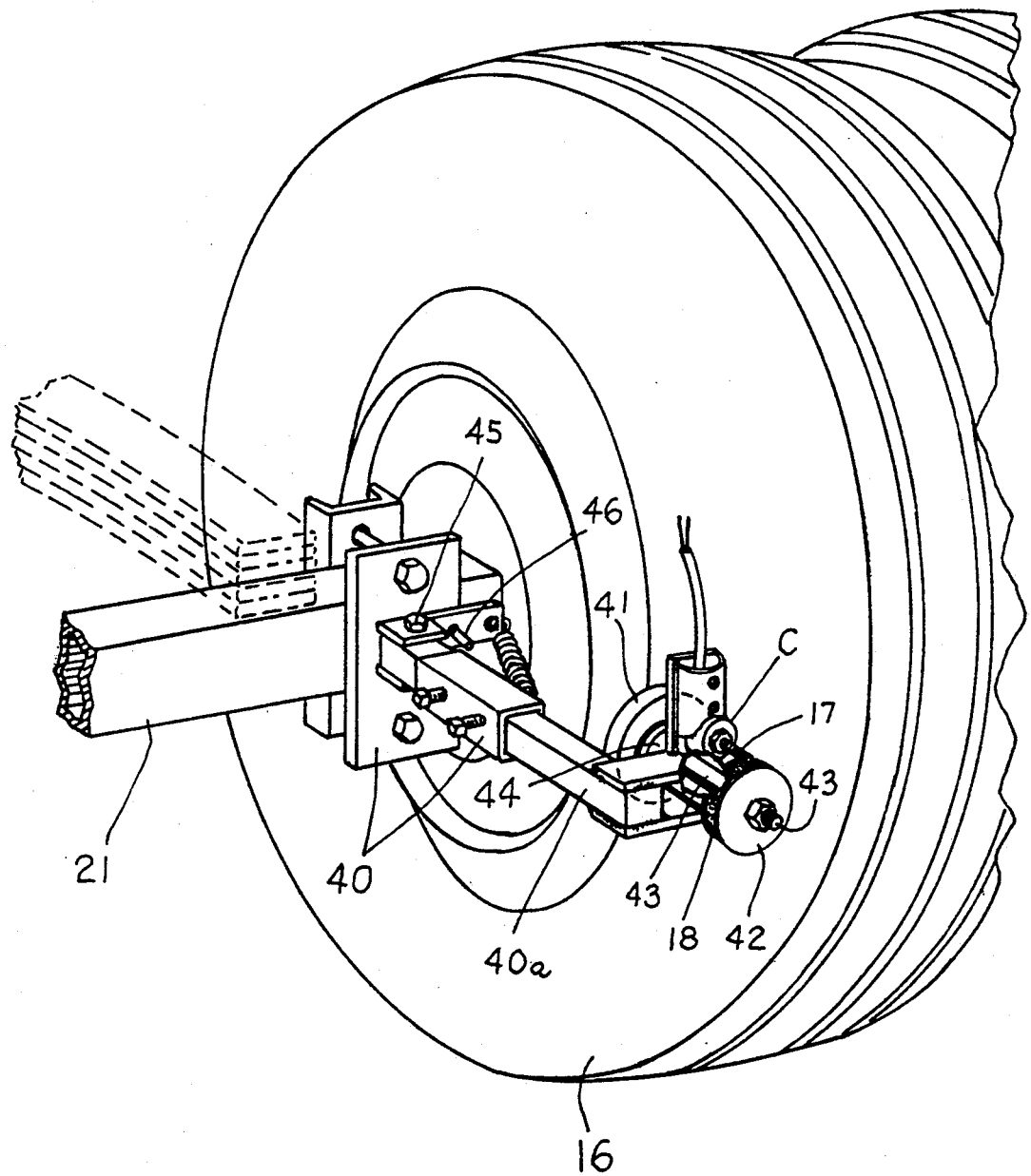
FIG. 3 is a perspective view illustrating apparatus constructed in accordance with a modified form of the invention in which a rotatable member is spring biased into engagement with a trailer wheel for initiating an output signal from a sensor to automatically place anti-jackknifing components in position to prevent jackknifing of a tractor trailer rig.

Sensing apparatus in accordance with a modified embodiment of the invention for use with an anti-jackknifing device for a tractor trailer rig is illustrated in FIG. 3. An abutment member A carried by the trailer (FIG. 1) is movable in response to a power operated drive B also carried by the trailer into and out of a slot defined by a fifth wheel 15 limiting the angular relation between the tractor and the trailer. The sensor C includes a sensing element 17. A mounting apparatus 40 positions the sensor C adjacent a wheel 16 on the trailer 11. A rotatable disk member 41 is carried by the mounting apparatus in driven relation to the trailer wheel so as to be driven thereby at a speed indicative of the speed of said trailer wheel. An actuating element such as the magnetic tape 18 of FIG. 42 is carried for rotation by a driven member 2 driven by the rotatable member 41 producing an output signal from the sensor including the magnetic tape when said trailer wheel has attained a predetermined speed actuating the power operated drive B in response to the speed controlled switch D to cause the abutment member to move into the slot. A biasing member such as a spring 43 urges the rotatable member into such driven relation to the trailer wheel during operation of the rig. Thus, the rotatable member is assured of being in driven relation, as after a tire change, to cause the abutment member to move into the slot thus assuring automatic operation of the anti-jackknifing device upon attainment of a predetermined speed by the rig. The rubber disc 41 drives the driven member 42 carrying the magnetic tape 18 through a shaft 43 in the bearing 44. The mounting 40 includes a standard 40a pivoted as at 45. A stop member 46 limits the inner pivotal movement of the standard 40a responsive to the spring 43.

Thus, the method contemplates urging the rotatable member 31 into driven relation to the trailer wheel 16 during operation of the rig. The rotatable member is assured of being in driven relation at all times during operation.

A further modified form of the invention is illustrated in FIG. 1B wherein a radar gun 60 is mounted on a bracket 61 suitably secured as by bolts (not shown) to the transversely extending cross frame member 11a so as to project forwardly and downwardly toward the ground, a known distance away. The radar gun is attached to the bracket as by the strap 62. By utilizing the radar signal and Doppler effect produced by a return signal, the switch D is actuated or other switching action is effected when a predetermined ground speed of the trailer is reached sending a signal through the line 63 to the air valve 24 through the line 28. Thus, the sensors C described above may be eliminated in favor of the radar gun as an actuator for the air valve 24.

While a preferred embodiment of the invention has been described using specific terms, such description is for illustrative purposes only, and it is to be understood that changes and variations may be made without departing from the spirit or scope of the following claims.

What is claimed is:

1. An anti-jackknifing apparatus for use in a coupling of a tractor having a fifth wheel with a longitudinal outwardly tapering slot therein and a trailer having a frame thereunder comprising:
   an abutment member carried by said frame;
   a power operated drive moving said abutment member into said slot and retracting it therefrom carried by said frame;
   a sensor carried by said trailer producing a signal reflecting the speed of said trailer; and
   a speed controlled switch carried by said trailer actuating said power operated drive to place said abutment member in said slot when a predetermined speed is attained by said trailer responsive to said signal;
   whereby the abutment member of said anti-jackknifing apparatus is placed in operative position in said slot when a predetermined speed is attained by said trailer.

2. The structure set forth in claim 1 including a signal light observable by a driver of the tractor trailer indicating that said abutment member is in said slot.

3. The structure set forth in claim 2 wherein the signal light, the sensor and the speed controlled switch are carried by the trailer.

4. The structure set forth in claim 1 wherein said tractor includes a brake and turn signals, and a switch component whereby said brake at speeds below said predetermined speed actuates said anti-jackknifing apparatus.

5. The structure set forth in claim 1 including a spring biasing said sensor toward a wheel.

6. The structure set forth in claim 5 including means for rotating and actuating by engagement with said wheel.

7. The structure set forth in claim 1 wherein said sensor includes a source of radar signals.

8. An anti-jackknifing apparatus for use in a coupling of a tractor having a fifth wheel with a longitudinal outwardly tapering slot therein and a trailer having a frame thereunder comprising:
   an abutment member carried by said frame;
   a power operated drive moving said abutment member into said slot and retracting it therefrom carried by said frame;
   a sensor carried by said trailer adjacent the wheels of the trailer sensing rotation of a wheel producing a signal reflecting the speed of said trailer;
   a speed controlled switch carried by said trailer actuating said power operated drive to place said abutment member in said slot when a predetermined speed is attained by said trailer responsive to said signal;
   turn signals;
   means actuating said anti-jackknifing apparatus at speeds below said predetermined speed; and
   switch components actuated by respective turn signals to block said action of said means;
   whereby the abutment member of said anti-jackknifing apparatus is placed in operative position in said slot when a predetermined speed is attained by said trailer.

9. An anti-jackknifing apparatus for use in a coupling of a tractor having a fifth wheel with a longitudinal outwardly tapering slot therein and a trailer having a frame thereunder comprising:
  an abutment member carried by said frame;
  a power operated drive moving said abutment member into said slot and retracting it therefrom carried by said frame;
  a sensor carried by said trailer for producing a signal reflecting the speed of said trailer; and
  a speed controlled switch carried by said trailer actuating said power operated drive to retract said abutment member from said slot when the speed of said trailer is reduced to a speed below a predetermined speed;
  whereby the abutment member of said anti-jackknifing apparatus is retracted from said slot when the speed of said trailer is reduced to a speed below said predetermined speed.

10. The structure set forth in claim 9 including a signal observable by a driver of the tractor trailer indicating that said abutment member is disengaged from said slot.

11. Sensing apparatus for use with an anti-jackknifing device for a tractor trailer rig wherein an abutment member carried by the trailer is moveable in response to a power operated drive also carried by the trailer into and out of a slot defined by a fifth wheel limiting the angular relation between the tractor and the trailer comprising:
  a sensor;
  a mounting apparatus positioning said sensor adjacent a wheel on said trailer;
  a rotatable member carried by said mounting apparatus in driving relation to said trailer wheel so as to be driven thereby at a speed indicative of the speed of said trailer wheel;
  said sensor including an actuating element carried for rotation with said rotatable member producing an output signal from said sensor when said trailer wheel has attained a predetermined speed actuating said power operated drive to cause said abutment member to move into said slot; and
  a biasing member urging said rotatable member into driven relation to said trailer wheel during operation of the rig;
  whereby the rotatable member is assured of being in said driven relation as after a tractor wheel change to cause said abutment member to move into said slot, thus assuring automatic operation of the anti-jackknifing device upon attainment of a predetermined speed by the rig.

12. The structure set forth in claim 11 wherein said mounting apparatus includes a pivoted standard, and said biasing member is a spring.

13. The structure set forth in claim 12 including a rotatable support for said rotating member, and a drive between said rotatable member and said rotatable support carried by said standard.

14. The structure set forth in claim 13 wherein said actuating element is a magnetic tape carried by said rotatable support.

15. The method of controlling an anti-jackknifing apparatus for use in a coupling of a tractor having a fifth wheel with a longitudinal outwardly tapering slot therein and a trailer having a frame thereunder comprising the steps of:
  providing an abutment member carried by said frame and a power operated drive moving said abutment member into said slot and retracting it therefrom;
  providing a sensor for producing a signal reflecting the speed of said trailer on said trailer; and
  carrying a speed controlled switch on said trailer actuating said power operated drive to place said abutment member in said slot when a predetermined speed is attained by said trailer responsive to said signal;
  whereby the abutment member of said anti-jackknifing apparatus is placed in operative position in said slot when a predetermined speed is attained by said trailer.

16. The method set forth in claim 15 including positioning a signal observable by a driver of the tractor trailer on said trailer indicating that said abutment member is in said slot.

17. The method of controlling an anti-jackknifing apparatus for use in a coupling of a tractor having a fifty wheel with a longitudinal outwardly tapering slot therein and a trailer having a frame thereunder comprising the steps of:
  providing an abutment member carried by said frame and a power operated drive moving said abutment member into said slot and retracting it therefrom;
  sensing the speed of a wheel of the trailer at a location adjacent its wheel producing a signal reflecting the speed of said trailer on said trailer; and
  carrying a speed controlled switch on said trailer actuating said power operated drive to place said abutment member in said slot when the speed of said trailer is reduced to a speed below a predetermined speed responsive to said signal;
  whereby the abutment member of said anti-jackknifing apparatus is retracted from said slot when the speed of said trailer is reduced to a speed below said predetermined speed.

18. The method set forth in claim 17 including positioning a signal observable by a driver of the tractor trailer on said trailer indicating that said abutment member is disengaged from said slot.

19. The method of mounting and actuating a sensing apparatus for use with an anti-jackknifing device for a tractor trailer rig in response to a power operated means moving an abutment into position for limiting the angular relation between the tractor and the trailer comprising the steps of:
  positioning a sensor adjacent a wheel on said trailer;
  driving a rotatable member at the same relative speed as the wheel on the trailer is turning;
  carrying an actuating element for rotation with the rotatable member producing an output signal from said sensor when said trailer which has attained a predetermined speed actuating said power operated drive; and
  urging said rotatable member into driven relation to said trailer wheel during operation of the rig;
  whereby the rotatable member is assured of being in said driven relation as after a trailer wheel change to cause actuation of said power operated drive, thus assuring automatic operation of the anti-jackknifing device upon attainment of a predetermined speed by the rig.

* * * * *